United States Patent
Ookawara et al.

(10) Patent No.: US 9,500,500 B2
(45) Date of Patent: Nov. 22, 2016

(54) RESOLVER

(71) Applicant: JAPAN AVIATION ELECTRONICS INDUSTRY, LIMITED, Tokyo (JP)

(72) Inventors: Hiroki Ookawara, Tokyo (JP); Toshifumi Yoshikawa, Tokyo (JP); Hirokuni Wakui, Tokyo (JP); Kenichi Nakazato, Tokyo (JP); Manabu Yazaki, Saitama (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 31 days.

(21) Appl. No.: 14/698,182

(22) Filed: Apr. 28, 2015

(65) Prior Publication Data

US 2015/0345995 A1    Dec. 3, 2015

(30) Foreign Application Priority Data

May 30, 2014   (JP) .................. 2014-113060

(51) Int. Cl.
   *G01B 7/14*   (2006.01)
   *H01F 5/00*   (2006.01)
   (Continued)

(52) U.S. Cl.
   CPC .............. *G01D 5/20* (2013.01); *G01D 5/2046* (2013.01); *G01P 3/488* (2013.01)

(58) Field of Classification Search
   CPC ....... H02K 3/28; G01D 5/2073; G01P 3/488

USPC ..................................... 324/207.15
See application file for complete search history.

(56) References Cited

U.S. PATENT DOCUMENTS 3,041,486 A * 6/1962 Moffitt .................. H02K 19/20
                                                   310/168
5,708,344 A    1/1998 Hayashi et al.
(Continued)

FOREIGN PATENT DOCUMENTS

JP        H10-239010       9/1998
JP        10-288537        10/1998
(Continued)

*Primary Examiner* — Reena Aurora
(74) *Attorney, Agent, or Firm* — Greenblum & Bernstein, P.L.C.

(57) ABSTRACT

The number of turns and the winding direction of a cosine-phase coil wound around an i-th tooth and the number of turns and the winding direction of a sine-phase coil wound around the i-th tooth are set according to $T_{c,i} = T_{Smax} \cos(m_s\xi_i + \theta_2) + T_{2c} \cos(m_e\xi_i + \theta_1)$ and $T_{s,i} = T_{Smax} \sin(m_s\xi_i + \theta_2) + T_{2s} \cos(m_e\xi_i + \theta_1)$, respectively, where $T_{Smax}$: a first reference number of turns of each of the detecting coils of each phase, $T_{2c}$: a second reference number of turns of each of the cosine-phase coils, $T_{2s}$: a second reference number of turns of each of the sine-phase coils, $m_e$: a pole pair number in a magnetic flux distribution formed by the exciting coils, $m_s$: a pole pair number in each magnetic flux distribution formed by the detecting coils of each phase, $\theta_1$: the phase of the exciting coils, $\theta_2$: each phase of the cosine-phase coils and the sine-phase coils, and $\xi_i$: a mechanical angle of the i-th tooth.

2 Claims, 11 Drawing Sheets

(51) Int. Cl.
 *G01D 5/20* (2006.01)
 *G01P 3/488* (2006.01)

(56) References Cited

U.S. PATENT DOCUMENTS 8,947,075 B2 * 2/2015 Tsuge .................. G01D 5/2046
 324/207.18

| | | |
|---|---|---|
| 2003/0074799 A1 | 4/2003 | Nakano et al. |
| 2013/0060518 A1 | 3/2013 | Nakazato |

FOREIGN PATENT DOCUMENTS

| | | |
|---|---|---|
| JP | 2012-210121 | 10/2012 |
| JP | 2013-053890 | 3/2013 |

* cited by examiner

FIG. 12

[Table 1]

| Tooth number | 1 | 2 | 3 | 4 | 5 | 6 | 7 | 8 | 9 | 10 |
|---|---|---|---|---|---|---|---|---|---|---|
| Exciting coil | 20 | -20 | 20 | -20 | 20 | -20 | 20 | -20 | 20 | -20 |
| Cosine-phase coil | 210 | -170 | 65 | 65 | -170 | 210 | -170 | 65 | 65 | -170 |
| Sine-phase coil | 0 | -123 | 200 | -200 | 123 | 0 | -123 | 200 | -200 | 123 |

FIG. 13

[Table 2]

| Tooth number | 1 | 2 | 3 | 4 | 5 | 6 | 7 | 8 | 9 | 10 |
|---|---|---|---|---|---|---|---|---|---|---|
| Exciting coil | 20 | -20 | 20 | -20 | 20 | -20 | 20 | -20 | 20 | -20 |
| Cosine-phase coil | 211 | -171 | 66 | 64 | -169 | 209 | -169 | 64 | 66 | -171 |
| Sine-phase coil | 0 | -123 | 200 | -200 | 123 | 0 | -123 | 200 | -200 | 123 |
| Adjustment of cosine phase | 1 | -1 | 1 | -1 | 1 | -1 | 1 | -1 | 1 | -1 |
| Adjustment of sine phase | 0 | 0 | 0 | 0 | 0 | 0 | 0 | 0 | 0 | 0 |

FIG. 14

[Table 3]

| Tooth number | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Exciting coil | 20 | -20 | 20 | -20 | 20 | -20 | 20 | -20 | 20 | -20 | 20 | -20 | 20 | -20 | 20 | -20 |
| Cosine-phase coil | 210 | -148 | 0 | 148 | -210 | 148 | 0 | -148 | 210 | -148 | 0 | 148 | -210 | 148 | 0 | -148 |
| Sine-phase coil | 0 | -148 | 210 | -148 | 0 | 148 | -210 | 148 | 0 | -148 | 210 | -148 | 0 | 148 | -210 | 148 |

FIG. 15

[Table 4]

| Tooth number | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Exciting coil | 20 | -20 | 20 | -20 | 20 | -20 | 20 | -20 | 20 | -20 | 20 | -20 | 20 | -20 | 20 | -20 |
| Cosine-phase coil | 211 | -149 | 1 | 148 | -209 | 148 | 1 | -149 | 211 | -149 | 1 | 148 | -209 | 148 | 1 | -149 |
| Sine-phase coil | 0 | -148 | 210 | -148 | 0 | 148 | -210 | 148 | 0 | -148 | 210 | -148 | 0 | 148 | -210 | 148 |
| Adjustment of cosine phase | 1 | -1 | 1 | 0 | 1 | 0 | 1 | -1 | 1 | -1 | 1 | 0 | 1 | 0 | 1 | -1 |
| Adjustment of sine phase | 0 | 0 | 0 | 0 | 0 | 0 | 0 | 0 | 0 | 0 | 0 | 0 | 0 | 0 | 0 | 0 |

RESOLVER

TECHNICAL FIELD

The present invention relates to a resolver, which is a kind of rotation angle sensor. In particular, it relates to a resolver that reduces a detected angle error caused by misalignment of a stator axis or misalignment of a rotor axis.

BACKGROUND ART

A resolver is a sensor that outputs an analog signal responsive to a physical rotation angle on the basis of the principle of a transformer. A typical resolver has a stator made of a magnetic material and a rotor made of a magnetic material disposed inside the stator. As an example of such conventional resolvers, FIG. 1 shows a schematic diagram showing a configuration of a one-phase excitation/two-phase output variable reluctance resolver 100 that outputs an analog signal responsive to a physical rotation angle of a rotor by taking advantage of a change of air-gap permeance between the rotor and a plurality of teeth provided on an inner side of a stator.

<Configuration>

As shown in FIG. 1, the illustrated variable reluctance resolver 100 comprises a cylindrical stator 10 and a columnar rotor 20.

On an inner wall of the cylindrical stator 10, a plurality of teeth 11 are arranged at equal intervals in such a way as to come full circle. In a cross section including the arrangement of teeth 11, each tooth 11 protrudes from the inner wall of the stator 10 so that end surfaces 11a of the plurality of teeth 11 facing the rotor 20 form a wall of a virtual cylinder 50. In the following description, a central axis of the virtual cylinder 50 will be referred to as a central axis 12 of the stator 10 or simply as a central axis 12. In FIG. 1, for the sake of simplicity, only some of the teeth and some of the end surfaces are denoted by reference numerals. In the example shown in FIG. 1, the number of teeth 11 is 16.

In this example, the rotor 20 is coupled to a shaft (not shown) that rotates with rotation of a component of a rotating machine, such as a motor or a generator, and rotates about a rotation axis 21. The rotor 20 is disposed to face the teeth 11 in an inner space of the stator 10 so that (1) the rotor 20 is not in contact with any tooth 11 and (2) the rotation axis 21 of the rotor 20 is aligned with the central axis 12 of the stator 10. In this way, the variable reluctance resolver 100 is configured so that the rotor 20 can freely rotate in the inner space of the stator 10.

The outer periphery of the rotor 20 is shaped so that (1) the rotor 20 does not come into contact with any tooth 11 when the rotor 20 is rotating and (2) the outer periphery of the rotor 20 gives the changes of sine or cosine wave-like $m_x$ cycles to the air-gap permeance between the teeth 11 and the rotor 20 in a range of one circle of the outer circumference of the rotor 20, where $m_x$ represents the drive number of the variable reluctance resolver 100. More specifically, the shape of the outer periphery of the rotor 20 is expressed by the following expression (1), where for convenience, in a vertical cross section of the rotor 20 taken at an arbitrary point along the direction of the rotation axis 21 of the rotor 20, the distance from the rotation axis 21 to an arbitrary point on the outer periphery of the rotor 20 is expressed by a radius r of a circular polar coordinate system having a pole (which is equivalent to the origin of an orthogonal coordinate system) through which the rotation axis 21 of the rotor 20 passes, and the angle formed around the pole by an arbitrary fixed ray (polar axis) on the circular polar coordinate system and the radius r is expressed by a polar angle σ. In this expression, $m_x$ denotes the drive number (that is, a pole pair number of the rotor), $r_0$ denotes a reference radius, $δ_0$ denotes a width of the air gap between the virtual cylinder 50 and the rotor 20 at a polar angle $σ=π/2m_x$ [rad], $δ_1$ denotes a width of the air gap between the virtual cylinder 50 and the rotor 20 at a polar angle $σ=0$ [rad], and $α=(δ_0/δ_1)-1$ denotes a gap change rate ($0<|α|<1$). The reference radius $r_0$ is a radius that prescribes the outer circumference of the rotor and is set to be somewhat larger than $δ_0/(1-|α|)$. Typically, the distance from the rotation axis 21 of the rotor 20 to the end surface 11a of the teeth 11 (that is, the radius of the virtual cylinder 50) is used as the reference radius $r_0$. The rotor 20 shown in FIG. 1 is a rotor with $m_x=2$.

$$r = r_0 - \frac{\delta_0}{1 + \left(\frac{\delta_0}{\delta_1} - 1\right)\cos(m_x\sigma)} = r_0 - \frac{\delta_0}{1 + \alpha\cos(m_x\sigma)} \quad (1)$$

<Coil Configuration for Magnetic Circuit>

An exciting coil 15 is wound around each tooth 11 with a predetermined number of turns and in a predetermined winding direction, and these exciting coils 15 are connected in series with each other. An alternating-current voltage $V_e$ from an exciting power supply (not shown) is applied to a circuit part formed by the series connection of the exciting coils 15. The number of turns and the winding direction of the exciting coil 15 of each tooth 11 are determined so that a sine wave-like or cosine wave-like exciting magnetic flux distribution occurs when the alternating-current voltage $V_e$ is applied. To achieve a good exciting magnetic flux distribution with less distortion, the exciting coils 15 of adjacent two teeth 11 are preferably wound in the opposite directions. More specifically, the number of turns and the winding direction of the exciting coil 15 wound around the tooth 11 that corresponds to a mechanical angle ξ are given by $T_e$ which is expressed by the following expression (2), where $m_e$ denotes the pole pair number in a magnetic flux distribution formed by the exciting coils 15, $T_{Emax}$ denotes the reference number of turns of each of the exciting coils 15, and the mechanical angle ξ denotes an angle around the central axis 12 formed by a reference tooth 11 (referred to as a reference tooth 11S, hereinafter) arbitrarily selected from among the plurality of teeth 11 and another arbitrary tooth 11. That is, the number of turns is $|T_e|$, and the winding direction is a clockwise direction when the polarity of $T_e$ is positive and a counterclockwise direction when the polarity of $T_e$ is negative. The "clockwise" and "counterclockwise" used herein are directions defined on the assumption that the teeth 11 are viewed from the central axis 12 (the same holds true for the following description). The mechanical angle ξ is 0 [rad] (ξ=0 [rad]) at the position of the reference tooth 11S. When the total number of teeth 11 is N, $m_e=N/2$. In FIG. 1, for the sake of simplicity, only some of the exciting coils are denoted by reference numerals.

$$T_e = T_{E\,max} \cos(m_e\xi) \quad (2)$$

Furthermore, two detecting coils of different phases are wound around each tooth 11. One of the detecting coils will be referred to as a cosine-phase coil 17, and the other detecting coil will be referred to as a sine-phase coil 19. The cosine-phase coils 17 are connected in series with each other, and the sine-phase coils 19 are also connected in series with each other.

The number of turns and the winding direction of the cosine-phase coil 17 wound around each tooth 11 are set so that "$m_x$ cycles of cosine wave-like output voltage occur in the circuit part formed by the series connection of the cosine-phase coils 17 in a range of one circle of the inner circumference of the stator 10 (that is, in a range of the mechanical angle between 0 [rad] and $2\pi$ [rad])" on the basis of the polarity of the exciting coil 15. More specifically, the number of turns and the winding direction of the cosine-phase coil 17 wound around the tooth 11 corresponding to the mechanical angle $\xi$ are given by $T_c$ expressed by the following expression (3), where the number of turns and the winding direction of the exciting coil 15 wound around the tooth 11 corresponding to the mechanical angle $\xi$ are given by $T_e$ which is expressed by the expression (2), $m_s$ denotes the pole pair number in a magnetic flux distribution formed by the detecting coils, and $T_{Smax}$ denotes the reference number of turns of each of the detecting coils. That is, the number of turns is $|T_c|$, and the winding direction is the clockwise direction when the polarity of $T_c$ is positive and the counterclockwise direction when the polarity of $T_c$ is negative. To be more strict, no cosine-phase coil 17 is wound around the tooth 11 that corresponds to the mechanical angle $\xi$ with which a relation $|T_c|=0$ holds. In FIG. 1, for the sake of simplicity, only some of the cosine-phase coils are denoted by reference numerals.

$$T_c = T_{S\,max} \cos(m_s \xi) \quad (3)$$

The number of turns and the winding direction of the sine-phase coil 19 wound around each tooth 11 are set so that "$m_x$ cycles of sine wave-like output voltage occur in the circuit part formed by the series connection of the sine-phase coils 19 in a range of one circle of the inner circumference of the stator 10 (that is, in a range of the mechanical angle between 0 [rad] and $2\pi$ [rad])" on the basis of the polarity of the exciting coil 15. More specifically, the number of turns and the winding direction of the sine-phase coil 19 wound around the tooth 11 corresponding to the mechanical angle $\xi$ are given by $T_s$ expressed by the following expression (4), where the number of turns and the winding direction of the exciting coil 15 wound around the tooth 11 corresponding to the mechanical angle $\xi$ are given by $T_e$ expressed by the expression (2), $m_s$ denotes the pole pair number in a magnetic flux distribution formed by the detecting coils, and $T_{Smax}$ denotes the reference number of turns of each of the detecting coils. That is, the number of turns is $|T_s|$, and the winding direction is the clockwise direction when the polarity of $T_s$ is positive and the counterclockwise direction when the polarity of $T_s$ is negative. To be more strict, no sine-phase coil 19 is wound around the tooth 11 that corresponds to the mechanical angle $\xi$ with which a relation $|T_s|=0$ holds. In FIG. 1, for the sake of simplicity, only some of the sine-phase coils are denoted by reference numerals.

$$T_s = T_{S\,max} \sin(m_s \xi) \quad (4)$$

With the variable reluctance resolver 100, the rotor 20 is not provided with any coil.

With the configuration described above, when the rotor 20 rotates in a variable magnetic field induced by an alternating current flowing through the exciting coils 15, a cosine-phase output voltage $V_{cos}$ having a voltage amplitude responsive to the rotation angle of the rotor 20 occurs in the circuit part formed by the cosine-phase coils 17, and a sine-phase output voltage $V_{sin}$ having a voltage amplitude responsive to the rotation angle of the rotor 20 occurs in the circuit part formed by the sine-phase coils 19. The rotation angle of the rotor 20 can be detected from the two output voltage of the two phases.

Resolvers like the resolver described above are disclosed in Patent literature 1 (Japanese Patent Application Laid-Open No. 2013-53890) and Patent Literature 2 (Japanese Patent Application Laid-Open No. H10-239010).

With the configuration described above, a mismatch between the rotation axis 21 of the rotor 20 and the central axis 12 of the stator 10 (see FIG. 2) has an effect on the air gap between the teeth 11 and the rotor 20. As a result, the air-gap permeance between the teeth 11 and the rotor 20 does not change in an ideal sine wave form or an ideal cosine wave form. The change of the air-gap permeance occurs in the voltage amplitude of each of the two output voltages of the two phases, so that any disturbance in the change of the air-gap permeance immediately causes an error of the detected rotation angle. That is, a mismatch between the rotation axis 21 of the rotor 20 and the central axis 12 of the stator 10 causes deterioration of precision of detection of the rotation angle.

Although a variable reluctance resolver has been described as an example, a similar problem occurs in resolvers with a common configuration, such as a brushless resolver.

SUMMARY OF THE INVENTION

An object of the present invention is to provide a resolver that reduces an error of a detected angle error caused by a mismatch between a rotation axis of a rotor and a central axis of a stator, that is, misalignment of a stator axis or misalignment of a rotor axis.

A resolver according to the present invention is a one-phase excitation/two-phase output resolver, wherein, letting N denote the total number of teeth and i denote an integer equal to or greater than 1 and equal to or smaller than N, the N representing an even number, the number of turns and the winding direction of a cosine-phase coil wound around an i-th tooth is set according to $$T_{c,i} = T_{S\,max} \cos(m_s \xi_i + \theta_2) + T_{2c} \cos(m_e \xi_i + \theta_1),$$

and the number of turns and the winding direction of a sine-phase coil wound around the i-th tooth is set according to $$T_{s,i} = T_{S\,max} \sin(m_s \xi_i + \theta_2) + T_{2s} \cos(m_e \xi_i + \theta_1).$$

In these expressions, $T_{Smax}$ represents a first reference number of turns of each of detecting coils of each phase (cosine-phase coils, sine-phase coils), $T_{2c}$ represents a second reference number of turns of each of the cosine-phase coils, $T_{2s}$ represents a second reference number of turns of each of the sine-phase coils, $m_x$ represents a drive number, $m_e$ represents a pole pair number in a magnetic flux distribution formed by exciting coils, $m_s$ represents a pole pair number in each magnetic flux distribution formed by the detecting coils of each phase (the cosine-phase coils, the sine-phase coils), $\theta_1$ represents a phase of the exciting coils, $\theta_2$ represents a phase of the detecting coils of each phase (the cosine-phase coils, the sine-phase coils), $\xi_i$ represents a mechanical angle of the i-th tooth ($=2\pi(i-1)/N$), and relations $m_s \pm m_e \pm m_x = 0$ and $|m_x| \neq |2m_e|$ hold. The number of turns of the cosine-phase coil is represented by the absolute value of $T_{c,i}$, the winding direction of the cosine-phase coil is represented by the sign of $T_{c,i}$, the number of turns of the sine-phase coil is represented by the absolute value of $T_{s,i}$, and the winding direction of the sine-phase coil is represented by the sign of $T_{s,i}$.

For example, the second reference number of turns $T_{2c}$ of the cosine-phase coil and the second reference number of turns $T_{2s}$ of the sine-phase coil can be determined according to $$T_{2c} = \frac{\alpha \cdot \eta_1 \cdot A_{max} \cdot T_{S\ max}}{2\sqrt{1 + \tan^2(\eta_2 \mu_{max})}}$$

$$T_{2s} = T_{2c} \tan(\eta_2 \mu_{max})$$

based on a value of $A_{max}$ multiplied by $\eta_1$ and an antiphase of a value of $\mu_{max}$ multiplied by $\eta_2$, where $\alpha$ represents a gap change rate that satisfies a relation $0<|\alpha|<1$, $\eta_1$ and $\eta_2$ are predefined constant values that satisfy relations $0<\eta_1<1$ and $0<\eta_2<1$, and the $A_{max}$ and the $\mu_{max}$ are respectively a maximum amplitude and a maximum phase error of a detected angle error of the resolver expected in advance.

Effects of the Invention

According to the present invention, since the number of turns and the winding direction of the cosine-phase coil are adjusted with the number of turns and the winding direction expressed as $T_{2c} \cos(m_e \xi_i + \theta_1)$, and the number of turns and the winding direction of the sine-phase coil are adjusted with the number of turns and the winding direction expressed as $T_{2s} \cos(m_e \xi_i + \theta_1)$, the detected angle error caused by a mismatch between the rotation axis of the rotor and the central axis of the stator can be reduced.

BRIEF DESCRIPTION OF THE DRAWINGS

FIG. 12 shows an example of the number of turns and the winding direction of each coil according to the prior art (Table 1; N=10, $m_x$=1, $T_{Emax}$=20, $T_{Smax}$=210, $m_e$=5, $m_s$=4, $m_x$=1, $\alpha$=0.5);

FIG. 13 shows an example of the number of turns and the winding direction of each coil according to the embodiment with specific example 1 (Table 2; N=10, $m_x$=1, $T_{Emax}$=20, $T_{Smax}$=210, $m_e$=5, $m_s$=4, $m_x$=1, $\alpha$=0.5, $A_{max}$=0.03, $\mu_{max}$=0, $\theta_0$=0, $\eta_1$=$\eta_2$=0.5, $T_{2c}$≈0.8, $T_{2s}$=0);

FIG. 14 shows an example of the number of turns and the winding direction of each coil according to the prior art (Table 3; N=16, $m_x$=2, $T_{Emax}$=20, $T_{Smax}$=210, $m_e$=8, $m_s$=6, $m_x$=2, $\alpha$=0.5); and FIG. 15 shows an example of the number of turns and the winding direction of each coil according to the embodiment with specific example 2 (Table 4; N=16, $m_x$=2, $T_{Emax}$=20, $T_{Smax}$=210, $m_e$=8, $m_s$=6, $m_x$=2, $\alpha$=0.5, $A_{max}$=0.034, $\mu_{max}$=0, $\theta_0$=0, $\eta_1$=$\eta_2$=0.5, $T_{2c}$≈0.9, $T_{2s}$=0).

DETAILED DESCRIPTION OF THE EMBODIMENTS

Figure 1:
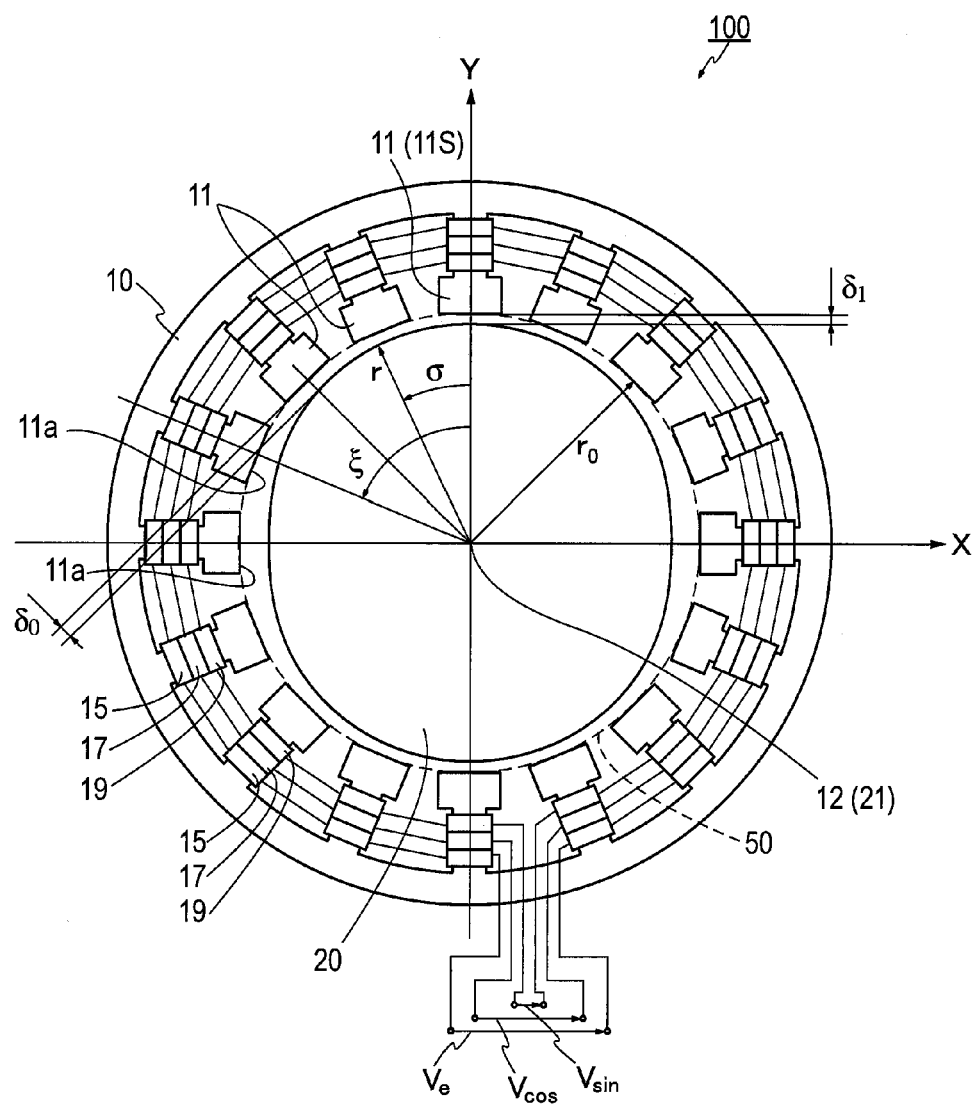
FIG. 1 is a schematic diagram showing a configuration of a conventional variable reluctance resolver.

An embodiment of the present invention will be described in the context of a variable reluctance resolver, for example. The configuration of the variable reluctance resolver according to this embodiment is the same as the configuration of the one-phase excitation/two-phase output variable reluctance resolver 100 described above as prior art. The coil arrangement for the magnetic circuit of the variable reluctance resolver according to this embodiment is also basically the same as the coil arrangement of the variable reluctance resolver 100 except for the numbers of turns and the winding directions of the cosine-phase coils and the sine-phase coils. Therefore, the above entire description of the one-phase excitation/two-phase output variable reluctance resolver 100 is incorporated into the following description except for the descriptions of the numbers of turns and the winding directions. The same components as those according to the one-phase excitation/two-phase output variable reluctance resolver 100 are denoted by the same reference numerals, redundant description thereof will be omitted, and differences between the embodiment of the present invention and the one-phase excitation/two-phase output variable reluctance resolver 100 will be described.

<<Analysis of Problems>>

On the basis of the configuration of the conventional variable reluctance resolver 100 described above, an error of the detected rotation angle caused by a mismatch between the rotation axis 21 of the rotor 20 and the central axis 12 of the stator 10 will be discussed.

Provided that the reference tooth 11S is the first tooth, and the mechanical angle $\xi$ of an i-th tooth 11 (i=1, 2, . . . , N) from the reference tooth 11S in the counterclockwise direction is $\xi_i$, $\xi_i = 2\pi(i-1)/N$ [rad]. As described above, the number of turns and the winding direction of each of the exciting coil 15, the cosine-phase coil 17 and the sine-phase coil 19 wound around the i-th tooth 11 can be determined according to the following expression (5). This expression takes into consideration a phase $\theta_1$ of the exciting coils 15 and a phase $\theta_2$ of the detecting coils.

$T_{e,i}$: the number of turns and the winding direction of the exciting coil wound around the i-th tooth $T_{c,i}$: the number of turns and the winding direction of the cosine-phase coil wound around the i-th tooth $T_{s,i}$: the number of turns and the winding direction of the sine-phase coil wound around the i-th tooth $T_{Emax}$: the reference number of turns of each of the exciting coils $T_{Smax}$: the reference number of turns of each of the detecting coils of each phase (cosine-phase coils, sine-phase coils)

$m_e$: the pole pair number in a magnetic flux distribution formed by the exciting coils $m_s$: the pole pair number in each magnetic flux distribution formed by the detecting coils of each phase (cosine-phase coils, sine-phase coils)

$\theta_1$: the phase of the exciting coils $\theta_2$: the phase of the detecting coils of each phase (cosine-phase coils, sine-phase coils)

$\xi_i$: the mechanical angle of the i-th tooth ($=2\pi(i-1)/N$)

N: the total number of teeth, which is an even number $$\left.\begin{array}{l} T_{e,i} = T_{Emax}\cos(m_e\xi_i + \theta_1) \\ T_{c,i} = T_{Smax}\cos(m_s\xi_i + \theta_2) \\ T_{s,i} = T_{Smax}\sin(m_s\xi_i + \theta_2) \end{array}\right\} \quad (5)$$

Figure 3:
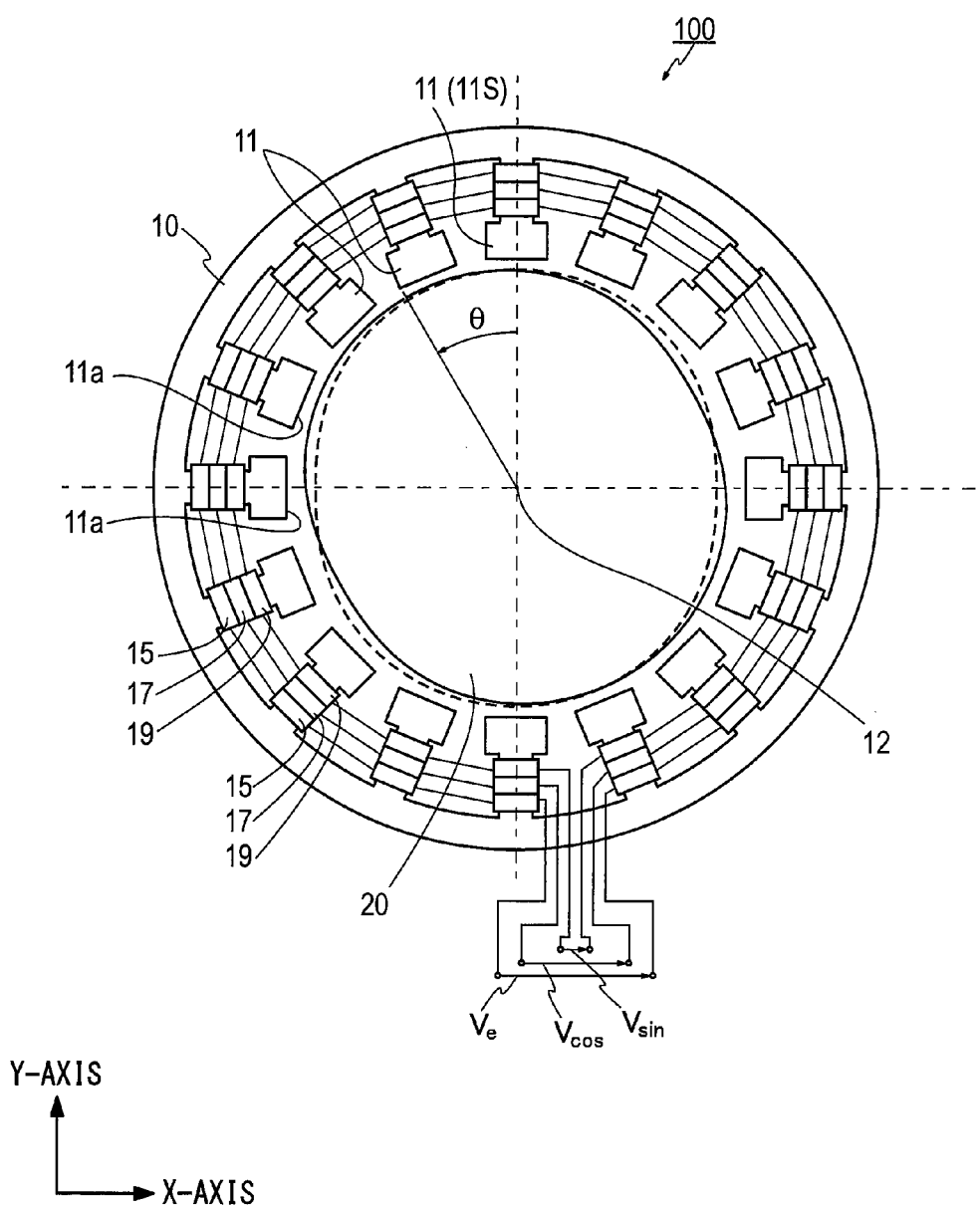
FIG. 3 is a diagram for illustrating a reference position and a rotation angle of the rotor.

As shown in FIG. 3, if the reference position of the rotor 20 is set so that a position at which the polar angle σ is 0 [rad] (that is, a position at which the width of the air gap is $\delta_1$) and a position at which the mechanical angle $\xi$ is 0 [rad] (that is, the position of the reference tooth 11S) correspond to each other, the cosine-phase output voltage and the sine-phase output voltage at the time when the rotor 20 is at a position rotated about the rotation axis 21 in the counter-clockwise direction by a rotation angle θ [rad] from the reference position are expressed by the following expression (6). This expression takes into consideration the fact that a mismatch between the rotation axis 21 of the rotor 20 and the central axis 12 of the stator 10 causes an error of the output voltage of each phase.

$V_{cos}$: the cosine-phase output voltage
$V_{sin}$: the sine-phase output voltage
$i_e$: the exciting current $A_1$: the maximum amplitude of each phase (cosine-phase, sine-phase)
$A_{2c}$: the error of the cosine-phase output voltage
$A_{2s}$: the error of the sine-phase output voltage
$m_x$: the drive number (pole pair number of the rotor)
$\theta_0$: the phase difference between the exciting voltage and the two output voltages of the two phases The signs of the errors $A_{2c}$ and $A_{2s}$ depend on the shaft displacement direction.

$$\left.\begin{array}{l} V_{cos} = (A_1\cos(m_x\theta + \theta_0) \pm A_{2c}) \cdot i_e \\ V_{sin} = (A_1\sin(m_x\theta + \theta_0) \pm A_{2s}) \cdot i_e \end{array}\right\} \quad (6)$$

With a resolver-digital converter operating according to a tracking-loop method, for example, provided that an output angle (expressed as an electrical angle [=drive number× mechanical angle]) of the resolver-digital converter is $m_x\theta'$ [rad e], an error deviation $\epsilon$ expressed by the following expression (7) is controlled to be zero. For information about the tracking-loop method, see Reference Literature 1, for example.

(Reference Literature 1) "Development of Resolver-Digital (R/D) Converter", Kenichi Nakazato et al., JAE Technical Report No. 32, Japan Aviation Electronics Industry, Ltd., 2009, March.

$$\begin{array}{l}\epsilon = (A_1\sin(m_x\theta+\theta_0)\pm A_{2s})\cos(m_x\theta')-(A_1\cos(m_x\theta+\theta_0)\\ \pm A_{2c})\sin(m_x\theta') = A_1\sin(m_x(\theta-\theta')+\theta_0)\pm A_{2s}\cos\\ (m_x\theta')\mp A_{2c}\sin(m_x\theta')\to 0\end{array} \quad (7)$$

Therefore, the following expression (8) holds.

$$A_1\sin(m_x(\theta'-\theta)-\theta_0) = \pm A_{2s}\cos(m_x\theta') \mp A_{2c}\sin(m_x\theta') \quad (8)$$

Taking into consideration the fact that $m_x\theta' \approx m_x\theta+\theta_0$, and $\sin(m_x(\theta'-\theta)-\theta_0) \approx m_x(\theta'-\theta)-\theta_0$, the following expression (9) holds for a detected angle error (referred to also as an electrical angle error) $m_x\theta_{err}$.

$$\begin{aligned} m_x\theta_{err} &= m_x(\theta' - \theta) - \theta_0 \\ &= \frac{\pm A_s\cos(m_x\theta') \mp A_{2c}\sin(m_x\theta')}{A_1} \\ &\approx \frac{\pm A_{2s}\cos(m_x\theta + \theta_0) \mp A_{2c}\sin(m_x\theta + \theta_0)}{A_1} \\ &= -\frac{\pm A_{2c}\sin(m_x\theta + \theta_0) \mp A_{2s}\cos(m_x\theta + \theta_0)}{A_1} \\ &= -\frac{\sqrt{A_{2s}^2 + A_{2c}^2}}{A_1}\sin\left(m_x\theta + \theta_0 - \tan^{-1}\left(\frac{A_{2s}}{A_{2c}}\right)\right) \end{aligned} \quad (9)$$

In this way, the error $A_{2c}$ of the cosine-phase output voltage and the error $A_{2s}$ of the sine-phase output voltage occur in the amplitude and the phase error of the detected angle error $m_x\theta_{err}$.

According to prior art, for example, given that $T_{Emax}=20$, $T_{Smax}=210$, $m_e=5$, $m_s=4$, $m_x=1$ and $\alpha=0.5$ as design values to provide a resolver having a drive number $m_x$ of 1 by using a stator the total number N of teeth of which is 10, the number of turns and the winding direction of each coil are set as shown in Table 1 shown in FIG. 12.

Figure 2:
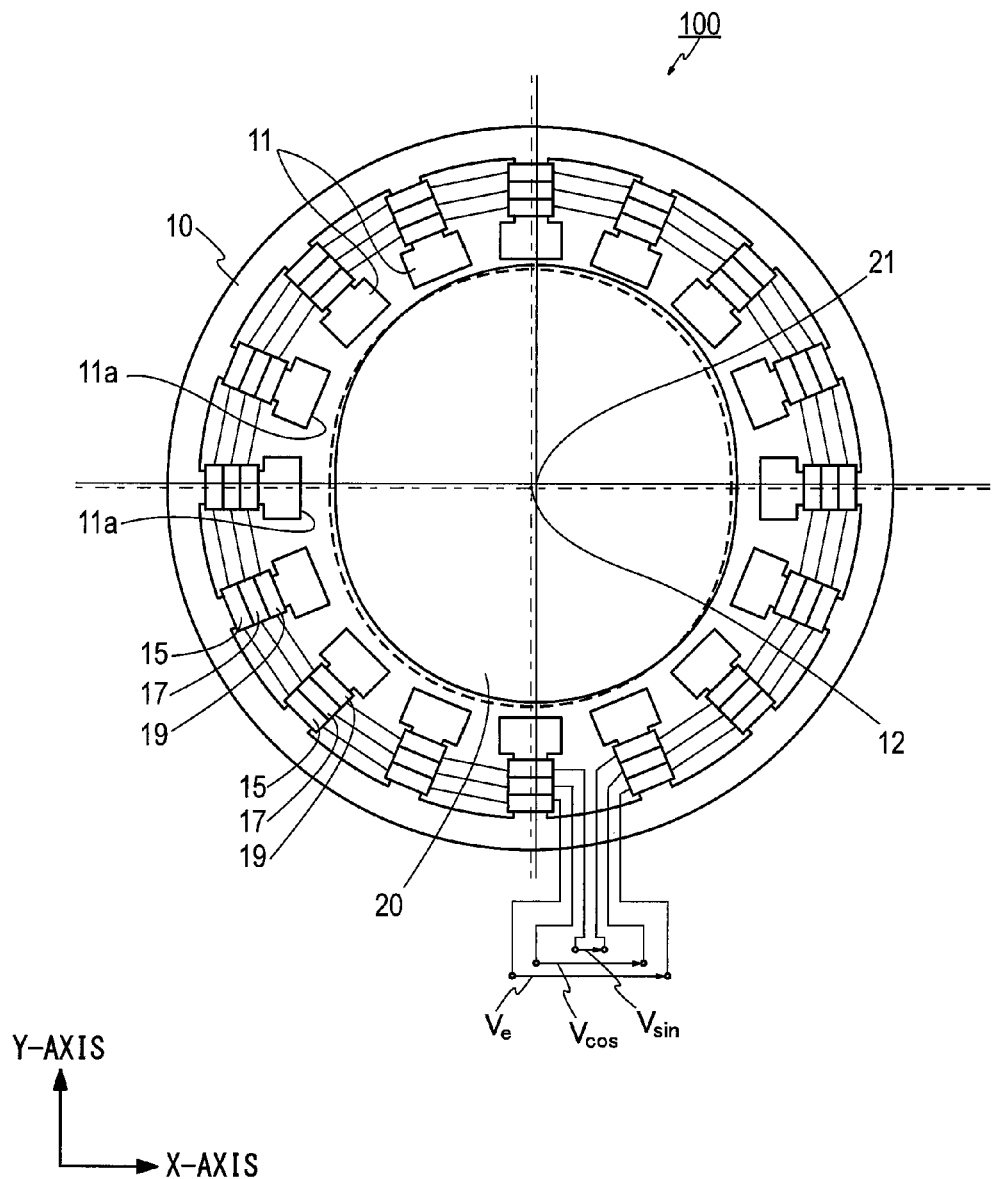
FIG. 2 is a diagram for illustrating a mismatch between a rotation axis of a rotor and a central axis of a stator.
Figure 4:
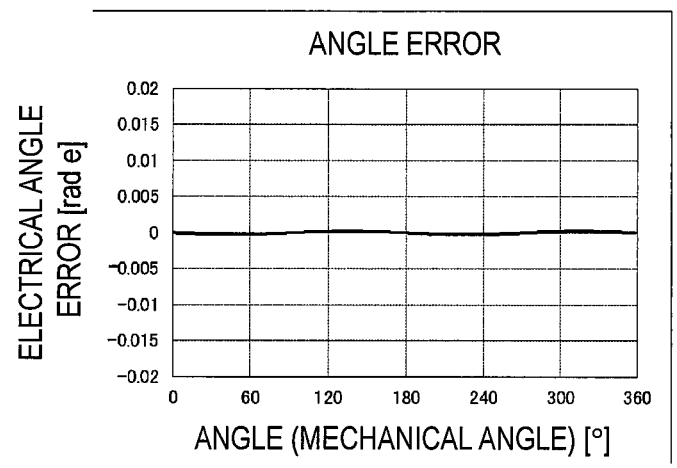
FIG. 4 is a graph showing a relationship between a mechanical angle and a detected angle error in a case where any mismatch between the rotation axis of the rotor and the central axis of the stator does not occur, where the number of turns and the winding direction are set according to prior art (the total number of teeth is 10, and the drive number is 1)
Figure 5:
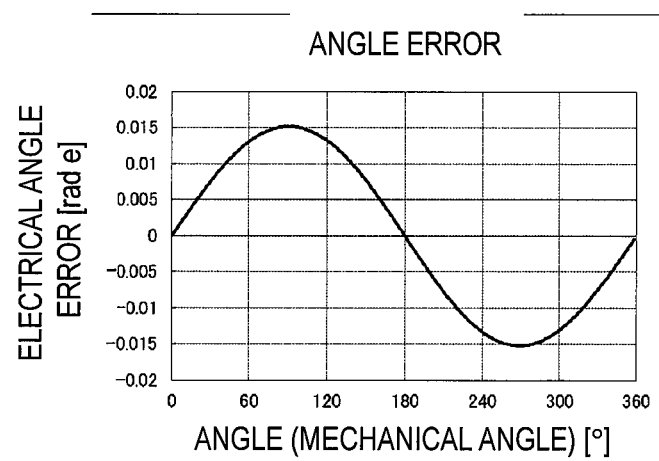
FIG. 5 is a graph showing a relationship between the mechanical angle and the detected angle error in a case where a mismatch between the rotation axis of the rotor and the central axis of the stator occurs, where the number of turns and the winding direction are set according to prior art (the total number of teeth is 10, and the drive number is 1)

Provided that $\theta_0=0$, the detected angle error $m_x\theta_{err}$ at the time when the rotation axis 21 of the rotor 20 and the central axis 12 of the stator 10 are aligned with each other is as shown in FIG. 4, and the detected angle error $m_x\theta_{err}$ at the time when the central axis 12 of the stator 10 is displaced from the rotation axis 21 of the rotor 20 by +15 μm in the direction of ξ=−π/2 [rad], that is, the direction of the arrow of the x axis shown in FIG. 2 is as shown in FIG. 5. Not only in FIGS. 4 and 5 but in the graphs shown in FIGS. 4 to 11, the vertical axis indicates the detected angle error $m_x\theta_{err}$ (labeled as "electrical angle error" in units of [rad e], which is the unit of the electrical angle), and the horizontal axis indicates the mechanical angle (shown in units of [°]). The width (peak-to-peak width) of the detected angle error $m_x\theta_{err}$ at the time when the rotation axis 21 of the rotor 20 and the central axis 12 of the stator 10 are aligned with each other is substantially 0 [rad e], and the width (peak-to-peak width) of the detected angle error $m_x\theta_{err}$ at the time when the central axis 12 of the stator 10 is displaced from the rotation axis 21 of the rotor 20 by +15 μm in the direction of the arrow of the x axis shown in FIG. 2 is approximately 0.03 [rad e].

<<Invention>>

In this way, it can be seen that the detected angle error $m_x\theta_{err}$ of the rotation angle caused by a mismatch between the rotation axis 21 of the rotor 20 and the central axis 12 of the stator 10 changes in sine wave form of $m_x$ cycles in the range of the mechanical angle from 0 [rad] to 2π [rad]. Thus, the detected angle error $m_x\theta_{err}$ of the rotation angle caused by a mismatch between the rotation axis 21 of the rotor 20 and the central axis 12 of the stator 10 can be reduced by adjusting the numbers of turns and the winding directions of the two detecting coils of the two phases wound around each tooth 11.

The number of turns and the winding direction of each of the exciting coil 15, the cosine-phase coil 17 and the sine-phase coil 19 wound around the i-th tooth 11 are defined by the following expressions (10). In this example, it is assumed that the extent of adjustment of the numbers of turns and the winding directions of the detecting coils is based on the influence of the magnetic field generated by the exciting coil 15. The expressions (10) take into consideration the phase $\theta_1$ of the exciting coils 15 and the phase $\theta_2$ of the detecting coils.

$T_{e,i}$: the number of turns and the winding direction of the exciting coil wound around the i-th tooth $T_{c,i}$: the number of turns and the winding direction of the cosine-phase coil wound around the i-th tooth $T_{s,i}$: the number of turns and the winding direction of the sine-phase coil wound around the i-th tooth $T_{Emax}$: the reference number of turns of each of the exciting coils $T_{Smax}$: a first reference number of turns of each of the detecting coils of each phase (cosine-phase coils, sine-phase coils)

$T_{2c}$: a second reference number of turns of each of the cosine-phase coils $T_{2s}$: a second reference number of turns of each of the sine-phase coils $m_e$: the pole pair number in a magnetic flux distribution formed by the exciting coils $m_s$: the pole pair number in each magnetic flux distribution formed by the detecting coils of each phase (cosine-phase coils, sine-phase coils)

$\theta_1$: the phase of the exciting coils $\theta_2$: the phase of the detecting coils of each phase (cosine-phase coils, sine-phase coils)

$\xi_i$: the mechanical angle of the i-th tooth (=2π(i−1)/N)

N: the total number of teeth, which is an even number $$\left.\begin{array}{l} T_{e,i} = T_{Emax}\cos(m_e\xi_i + \theta_1) \\ T_{c,i} = T_{Smax}\cos(m_s\xi_i + \theta_2) + T_{2c}\cos(m_e\xi_i + \theta_1) \\ T_{s,i} = T_{Smax}\sin(m_s\xi_i + \theta_2) + T_{2s}\cos(m_e\xi_i + \theta_1) \end{array}\right\} \quad (10)$$

In this case, when the rotation angle of the rotor 20 is θ [rad], a cosine-phase output voltage $V_{cos,i}$ that occurs on the i-th tooth 11 is expressed by the following expression (11).

$i_e$: the exciting current
P: an average value of the gap permeance
$m_x$: the drive number
α: a gap change rate $$V_{cos,i} = i_e \cdot P \cdot \{1 + \alpha\cos(m_x(\theta + \xi_i))\} \cdot \{T_{Smax}\cos(m_s\xi_i + \theta_2) + \quad (11)$$
$$T_{2c}\cos(m_e\xi_i + \theta_1)\} \cdot T_{Emax}\cos(m_e\xi_i + \theta_1)$$
$$= i_e \cdot P \cdot T_{Emax} \cdot \{1 + \alpha\cos(m_x(\theta + \xi_i))\} \cdot \left[\frac{T_{Smax}}{2}\{\cos((m_s + m_e)\xi_i + \theta_1 + \theta_2) + \cos((m_s - m_e)\xi_i - \theta_1 + \theta_2)\} + \right.$$
$$\left. \frac{T_{2c}}{2}\{\cos(2m_e\xi_i + 2\theta_1) + 1\}\right]$$
$$= i_e \cdot P \cdot T_{Emax} \cdot \left[\frac{T_{Smax}}{2}\{\cos((m_s + m_e)\xi_i + \theta_1 + \theta_2) + \right.$$
$$\cos((m_s - m_e)\xi_i - \theta_1 + \theta_2)\} + \frac{T_{2c}}{2}\{\cos(2m_e\xi_i + 2\theta_1) + 1\} +$$
$$\frac{\alpha T_{Smax}}{4}\cos((m_s + m_e + m_x)\xi_i + \theta_1 + \theta_2 + m_x\theta) +$$
$$\frac{\alpha T_{Smax}}{4}\cos((m_s + m_e - m_x)\xi_i + \theta_1 + \theta_2 - m_x\theta) +$$
$$\frac{\alpha T_{Smax}}{4}\cos((m_s - m_e + m_x)\xi_i - \theta_1 + \theta_2 + m_x\theta) +$$
$$\frac{\alpha T_{Smax}}{4}\cos((m_s - m_e - m_x)\xi_i - \theta_1 + \theta_2 - m_x\theta) +$$
$$\frac{\alpha T_{2c}}{4}\cos((2m_e + m_x)\xi_i + 2\theta_1 + m_x\theta) +$$
$$\frac{\alpha T_{2c}}{4}\cos((2m_e - m_x)\xi_i + 2\theta_1 - m_x\theta) +$$
$$\left. \frac{\alpha T_{2c}}{4}\cos(m_x\xi_i + m_x\theta) + \frac{\alpha T_{2c}}{4}\cos(-m_x\xi_i - m_x\theta)\right]$$

Similarly, when the rotation angle of the rotor 20 is θ [rad], a sine-phase output voltage $V_{sin,i}$ that occurs on the i-th tooth 11 is expressed by the following expression (12).

$$V_{sin,i} = i_e \cdot P \cdot \{1 + \alpha\cos(m_x(\theta + \xi_i))\} \cdot \{T_{Smax}\sin(m_s\xi_i + \theta_2) + \quad (12)$$
$$T_{2s}\cos(m_e\xi_i + \theta_1)\} \cdot T_{Emax}\cos(m_e\xi_i + \theta_1)$$
$$= i_e \cdot P \cdot T_{Emax} \cdot \{1 + \alpha\cos(m_x(\theta + \xi_i))\} \cdot \left[\frac{T_{Smax}}{2}\{\sin((m_s + m_e)\xi_i + \right.$$
$$\left. \theta_1 + \theta_2) + \text{in}((m_s - m_e)\xi_i - \theta_1 + \theta_2)\} + s\frac{T_{2s}}{2} \right.$$
$$\left. \{\cos(2m_e\xi_i + 2\theta_1) + 1\}\right]$$
$$= i_e \cdot P \cdot T_{Emax} \cdot \left[\frac{T_{Smax}}{2}\{\sin((m_s + m_e)\xi_i + \theta_1 + \theta_2) + \sin((m_s - \right.$$
$$m_e)\xi_i - \theta_1 + \theta_2)\} + \frac{T_{2s}}{2}\{\cos(2m_e\xi_i + 2\theta_1) + 1\} +$$
$$\frac{\alpha T_{Smax}}{4}\sin((m_s + m_e + m_x)\xi_i + \theta_1 + \theta_2 + m_x\theta) +$$
$$\frac{\alpha T_{Smax}}{4}\sin((m_s + m_e - m_x)\xi_i + \theta_1 + \theta_2 - m_x\theta) +$$

-continued $$\frac{\alpha T_{Smax}}{4}\sin((m_s - m_e + m_x)\xi_i - \theta_1 + \theta_2 + m_x\theta) +$$

$$\frac{\alpha T_{Smax}}{4}\sin((m_s - m_e - m_x)\xi_i - \theta_1 + \theta_2 - m_x\theta) +$$

$$\frac{\alpha T_{2s}}{4}\cos((2m_e + m_x)\xi_i + 2\theta_1 + m_x\theta) +$$

$$\frac{\alpha T_{2s}}{4}\cos((2m_e - m_x)\xi_i + 2\theta_1 - m_x\theta) +$$

$$\frac{\alpha T_{2s}}{4}\cos(m_x\xi_i + m_x\theta) + \frac{\alpha T_{2s}}{4}\cos(-m_x\xi_i - m_x\theta)\Big]$$

Therefore, in the case where $m_s \pm m_e \pm m_x = 0$ (that is, any one of $m_s + m_e + m_x = 0$, $m_s + m_e - m_x = 0$, $m_s - m_e + m_x = 0$ and $m_s - m_e - m_x = 0$), $|m_e| \neq |m_s|$, $|m_x| \neq |2m_e|$, $|m_x| \neq 0$, $|m_e| \neq 0$, and $|m_x| \neq 0$ (the symbol $|\bullet|$ represents the absolute value), the cosine-phase output voltage $V_{cos}$ and the sine-phase output voltage $V_{sin}$ are expressed by the following expressions (13), where N represents an even number.

$$V_{cos} = \sum_{i=1}^{N} V_{cos,i} = N \cdot i_e \cdot P \cdot T_{Emax} \cdot \left\{ \frac{\alpha T_{Smax}}{4}\cos(m_x\theta \pm \theta_1 \pm \theta_2) + \frac{T_{2c}}{2} \right\}$$

$$V_{sin} = \sum_{i=1}^{N} V_{sin,i} = N \cdot i_e \cdot P \cdot T_{Emax} \cdot \left\{ \frac{\alpha T_{Smax}}{4}\sin(m_x\theta \pm \theta_1 \pm \theta_2) + \frac{T_{2s}}{2} \right\}$$

(13)

By comparison between the expressions (6) and (13) on the assumption that $\theta_0 = \pm\theta_1 \pm \theta_2$, the relation expressed by the following expression (14) holds.

$$A_1 = N \cdot P \cdot T_{Emax} \cdot \frac{\alpha T_{Smax}}{4}$$
$$A_{2c} = N \cdot P \cdot T_{Emax} \cdot \frac{T_{2c}}{2}$$
$$A_{2s} = N \cdot P \cdot T_{Emax} \cdot \frac{T_{2s}}{2}$$

(14)

Therefore, it can be seen that the errors $A_{2c}$ and $A_{2s}$ of the two output voltages of the two phases caused by a mismatch between the rotation axis 21 of the rotor 20 and the central axis 12 of the stator 10 can be eliminated by setting $T_{2c}$ and $T_{2s}$ so that the following expressions (15) hold. The elimination of the errors $A_{2c}$ and $A_{2s}$ occur in the difference between the expressions (14) and (15), that is, the negative sign in the expression (15).

$$A_1 = N \cdot P \cdot T_{Emax} \cdot \frac{\alpha T_{Smax}}{4}$$
$$A_{2c} = -N \cdot P \cdot T_{Emax} \cdot \frac{T_{2c}}{2}$$
$$A_{2s} = -N \cdot P \cdot T_{Emax} \cdot \frac{T_{2s}}{2}$$

(15)

A specific method of determining $T_{2c}$ and $T_{2s}$ will be described. If the maximum amplitude $A_1$ of the detecting coils, the error $A_{2c}$ of the cosine-phase output voltage and the error $A_{2s}$ of the sine-phase output voltage can be detected, $T_{2c}$ and $T_{2s}$ can be determined on the basis of the detection values according to the following expression (16).

$$T_{2c} = -\frac{\alpha \cdot A_{2c} \cdot T_{Smax}}{2A_1}$$
$$T_{2s} = -\frac{\alpha \cdot A_{2s} \cdot T_{Smax}}{2A_1}$$

(16)

The variable reluctance resolver 100 is typically connected to a resolver-digital converter, and therefore, $T_{2c}$ and $T_{2s}$ can be determined on the basis of the detected angle error $m_x\theta_{err}$ described above if the resolver-digital converter is a tracking-loop resolver-digital converter.

In light of the expressions (9) and (14), the following expression (17) for the detected angle error $m_x\theta_{err}$ holds.

$$m_x\theta_{err} = -\frac{2\sqrt{T_{2s}^2 + T_{2c}^2}}{\alpha T_{Smax}}\sin\left(m_x\theta + \theta_0 - \tan^{-1}\left(\frac{T_{2s}}{T_{2c}}\right)\right)$$

(17)

From the expression (17), the amplitude A and the phase error μ of the detected angle error $m_x\theta_{err}$ due to the errors $A_{2c}$ and $A_{2s}$ are given by the following expressions (18).

$$A = \frac{2\sqrt{T_{2s}^2 + T_{2c}^2}}{\alpha T_{Smax}}$$
$$\tan\mu = \frac{T_{2s}}{T_{2c}}$$

(18)

As can be seen from the above description, if the detected angle error $m_x\theta_{err}$ of the rotation angle is known in advance, the errors $A_{2c}$ and $A_{2s}$ of the two output voltages of the two phases caused by a mismatch between the rotation axis 21 of the rotor 20 and the central axis 12 of the stator 10 can be eliminated by setting $T_{2c}$ and $T_{2s}$ on the basis of the amplitude A and the phase error μ of the detected angle error $m_x\theta_{err}$ due to the errors $A_{2c}$ and $A_{2s}$ so that the following expressions (19) hold. The elimination of the errors $A_{2c}$ and $A_{2s}$ occur in the antiphase in the expressions (19).

$$T_{2c} = \frac{\alpha \cdot A \cdot T_{Smax}}{2\sqrt{1 + \tan^2(\mu - \pi)}} = \frac{\alpha \cdot A \cdot T_{Smax}}{2\sqrt{1 + \tan^2\mu}}$$
$$T_{2s} = T_{2c} \cdot \tan(\mu - \pi) = T_{2c} \cdot \tan\mu$$

(19)

If the relative displacement distance and the relative displacement direction of the mismatch between the rotation axis 21 of the rotor 20 and the central axis 12 of the stator 10 are known in advance, $T_{2c}$ and $T_{2s}$ can be determined on the basis of the detected angle error $m_x\theta_{err}$ of the rotation angle, or on the basis of the maximum amplitude $A_1$ of the detecting coils, the error $A_{2c}$ of the cosine-phase output voltage and the error $A_{2s}$ of the sine-phase output voltage, that is, according to the expression (16) or (19). However, it is not practical to know in advance the relative displacement distance and the relative displacement direction of the mismatch between the rotation axis 21 of the rotor 20 and the central axis 12 of the stator 10, and the displacement distance and the displacement direction can change depending on the environment of the resolver in use, so that it is not always meaningful to determine $T_{2c}$ and $T_{2s}$ in advance on the premise of a particular displacement distance and a particular displacement direction. In addition, a mismatch between the rotation axis 21 of the rotor 20 and the central axis 12 of the stator 10 that exceeds a permissible level does not always occur. In view of such circumstances, in place of the expression (16), $T_{2c}$ and $T_{2s}$ can be determined according to, for example, the expression (20) based on a value of a value $A_{2c,max}$ multiplied by $\gamma_1$ and a value of a value $A_{2s,max}$ multiplied by $\gamma_2$, the value $A_{2c,max}$ being a maximum value of the cosine-phase output voltage error $A_{2c}$ expected in advance and the value $A_{2s,max}$ being a maximum value of the sine-phase output voltage error $A_{2s}$ expected in advance. $\gamma_1$ and $\gamma_2$ are predefined constant values that satisfy relations $0 < \gamma_1 < 1$ and $0 < \gamma_2 < 1$. For example, $\gamma_1 = \gamma_2 = 0.5$. Alternatively, in place of the expression (19), $T_{2c}$ and $T_{2s}$ can be determined according to, for example, the expression (21) based on a value of $A_{max}$ multiplied by $\eta_1$ and an antiphase of a value of $\mu_{max}$ multiplied by $\eta_2$, the $A_{max}$ and the $\mu_{max}$ being respectively a maximum amplitude and a maximum phase error of the detected angle error $m_x \theta_{err}$ expected in advance. $\eta_1$ and $\eta_2$ are predefined constant values that satisfy relations $0 < \eta_1 < 1$ and $0 < \eta_2 < 1$. For example, $\eta_1 = \eta_2 = 0.5$.

$$T_{2c} = -\frac{\alpha \cdot \gamma_1 \cdot A_{2c,max} \cdot T_{Smax}}{2A_1} \quad (20)$$
$$T_{2s} = -\frac{\alpha \cdot \gamma_2 \cdot A_{2s,max} \cdot T_{Smax}}{2A_1}$$

$$T_{2c} = \frac{\alpha \cdot \eta_1 \cdot A_{max} \cdot T_{Smax}}{2\sqrt{1+\tan^2(\pi - \eta_2 \mu_{max})}} = \frac{\alpha \cdot \eta_1 \cdot A_{max} \cdot T_{Smax}}{2\sqrt{1+\tan^2(\eta_2 \mu_{max})}} \quad (21)$$
$$T_{2s} = T_{2c} \cdot \tan(\pi - \eta_2 \mu_{max}) = T_{2c} \cdot \tan(\eta_2 \mu_{max})$$

If the value of $T_{2c}$ or $T_{2s}$ determined according to any of the expressions (16), (19), (20) and (21) is not an integer, the value can be rounded to an integer by round-down, round-up or round-off.

If at least one of relations $|T_{2c}| \neq 0$ and $|T_{2s}| \neq 0$ holds, the detected angle error $m_x \theta_{err}$ at the time when the rotation axis 21 of the rotor 20 and the central axis 12 of the stator 10 are aligned with each other is significant compared with prior art. However, when the relative displacement distance of the mismatch between the rotation axis 21 of the rotor 20 and the central axis 12 of the stator 10 is significant, the detected angle error due to this mismatch can be reduced, and the variation of the detected angle error within an expected range of the displacement distance can be reduced. Considering that the resolver is used in an adverse environment in which vibrations or shocks are expected compared with a rotary encoder, which is a kind of rotation angle sensor, such a trade-off relationship can be said to be rather beneficial.

Specific Example 1

In the case of the example shown in Table 1, $T_{2c} \approx 0.8$ and $T_{2s} = 0$ are obtained according to the expression (21) if the value of the maximum amplitude $A_{max}$ of the detected angle error $m_x \theta_{err}$ expected in advance is 0.03 [rad e], the value of the maximum phase error $\mu_{max}$ is 0 [rad], $\theta_0 = 0$, and $\eta_1 = \eta_2 = 0.5$. Therefore, according to this embodiment of the present invention, the number of turns and the winding direction of each coil are set as shown in Table 2 shown in FIG. 13.

Figure 6:
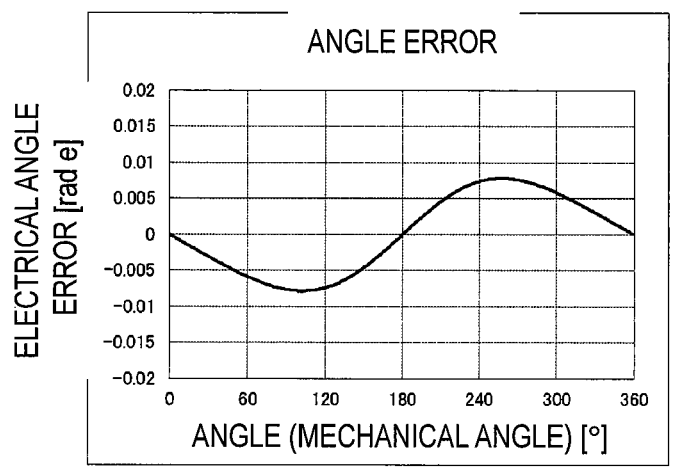
FIG. 6 is a graph showing a relationship between the mechanical angle and the detected angle error in a case where any mismatch between the rotation axis of the rotor and the central axis of the stator does not occur, where the number of turns and the winding direction are set according to an embodiment with specific example 1 (the total number of teeth is 10, and the drive number is 1)
Figure 7:
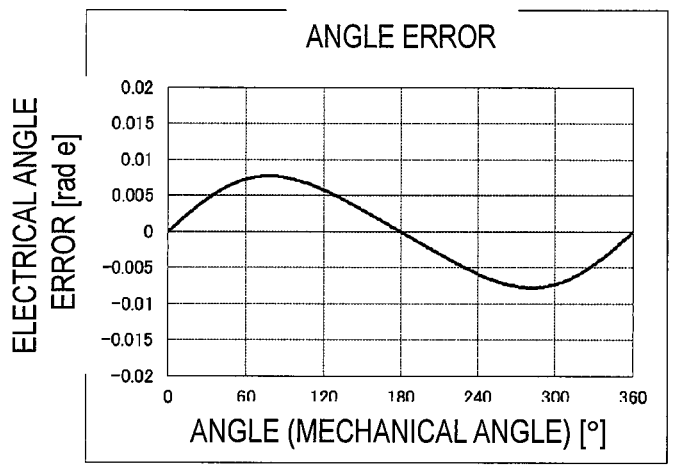
FIG. 7 is a graph showing a relationship between the mechanical angle and the detected angle error in a case where a mismatch between the rotation axis of the rotor and the central axis of the stator occurs, where the number of turns and the winding direction are set according to the embodiment with specific example 1 (the total number of teeth is 10, and the drive number is 1)

In this case, the detected angle error $m_x \theta_{err}$ at the time when the rotation axis 21 of the rotor 20 and the central axis 12 of the stator 10 are aligned with each other is as shown in FIG. 6, and the detected angle error $m_x \theta_{err}$ at the time when the central axis 12 of the stator 10 is displaced from the rotation axis 21 of the rotor 20 by +15 μm in the direction of $\xi = -\pi/2$ [rad], that is, the direction of the arrow of the x axis shown in FIG. 2 is as shown in FIG. 7. The width (peak-to-peak width) of the detected angle error $m_x \theta_{err}$ at the time when the rotation axis 21 of the rotor 20 and the central axis 12 of the stator 10 are aligned with each other is approximately 0.016 [rad e], and the width (peak-to-peak width) of the detected angle error $m_x \theta_{err}$ at the time when the central axis 12 of the stator 10 is displaced from the rotation axis 21 of the rotor 20 by +15 μm in the direction of the arrow of the x axis shown in FIG. 2 is 0.015 [rad e].

Specific Example 2

According to prior art, for example, given that $T_{Emax} = 20$, $T_{Smax} = 210$, $m_e = 8$, $m_s = 6$, $m_x = 2$ and $\alpha = 0.5$ as design values to provide a resolver having a drive number $m_x$ of 2 by using a stator the total number N of teeth of which is 16, the number of turns and the winding direction of each coil are set as shown in Table 3 shown in FIG. 14.

Figure 8:
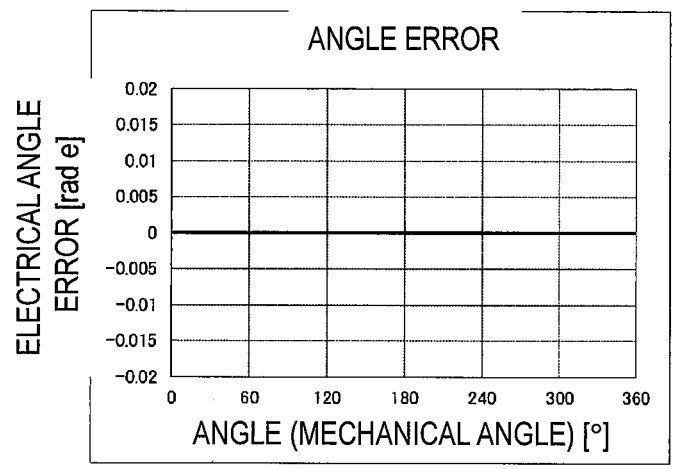
FIG. 8 is a graph showing a relationship between the mechanical angle and the detected angle error in a case where any mismatch between the rotation axis of the rotor and the central axis of the stator does not occur, where the number of turns and the winding direction are set according to prior art (the total number of teeth is 16, and the drive number is 2)
Figure 9:
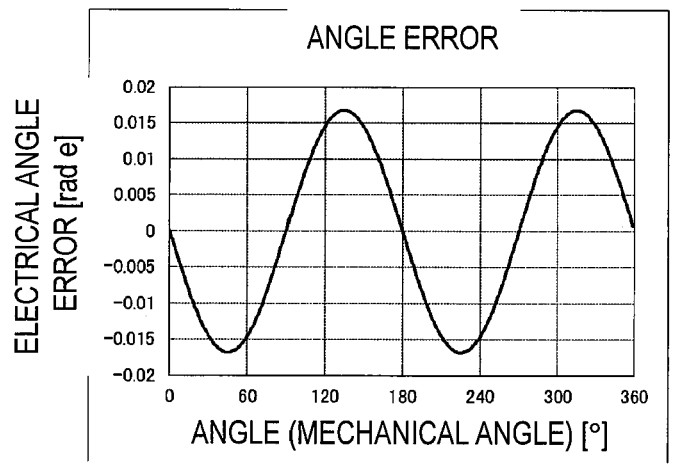
FIG. 9 is a graph showing a relationship between the mechanical angle and the detected angle error in a case where a mismatch between the rotation axis of the rotor and the central axis of the stator occurs, where the number of turns and the winding direction are set according to prior art (the total number of teeth is 16, and the drive number is 2)

Provided that $\theta_0 = 0$, the detected angle error $m_x \theta_{err}$ at the time when the rotation axis 21 of the rotor 20 and the central axis 12 of the stator 10 are aligned with each other is as shown in FIG. 8, and the detected angle error $m_x \theta_{err}$ at the time when the central axis 12 of the stator 10 is displaced from the rotation axis 21 of the rotor 20 by +0.25 mm in the direction of $\xi = -\pi/2$ [rad], that is, the direction of the arrow of the x axis shown in FIG. 2 is as shown in FIG. 9. The width (peak-to-peak width) of the detected angle error $m_x \theta_{err}$ at the time when the rotation axis 21 of the rotor 20 and the central axis 12 of the stator 10 are aligned with each other is substantially 0 [rad e], and the width (peak-to-peak width) of the detected angle error $m_x \theta_{err}$ at the time when the central axis 12 of the stator 10 is displaced from the rotation axis 21 of the rotor 20 by +0.25 mm in the direction of the arrow of the x axis shown in FIG. 2 is 0.034 [rad e].

In view of this, $T_{2c} \approx 0.9$ and $T_{2s} = 0$ are obtained according to the expression (21) if the value of the maximum amplitude $A_{max}$ of the detected angle error $m_x \theta_{err}$ expected in advance is 0.034 [rad e], the value of the maximum phase error $\mu_{max}$ is 0 [rad], $\theta_0 = 0$, and $\eta_1 = \eta_2 = 0.5$. Therefore, according to this embodiment of the present invention, the number of turns and the winding direction of each coil are set as shown in Table 4 shown in FIG. 15.

Figure 10:
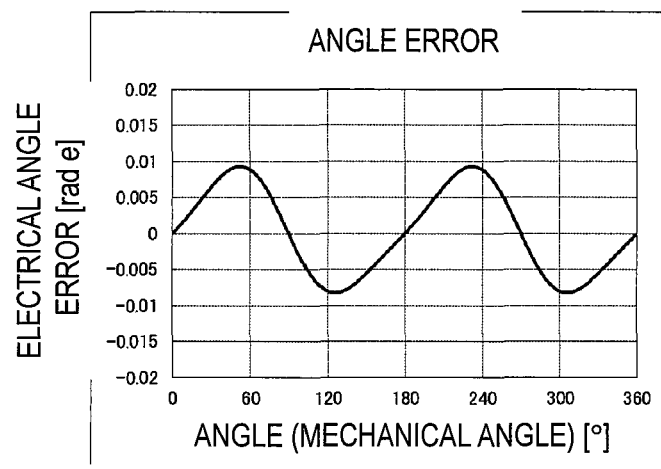
FIG. 10 is a graph showing a relationship between the mechanical angle and the detected angle error in a case where any mismatch between the rotation axis of the rotor and the central axis of the stator does not occur, where the number of turns and the winding direction are set according to the embodiment with specific example 2 (the total number of teeth is 16, and the drive number is 2)
Figure 11:
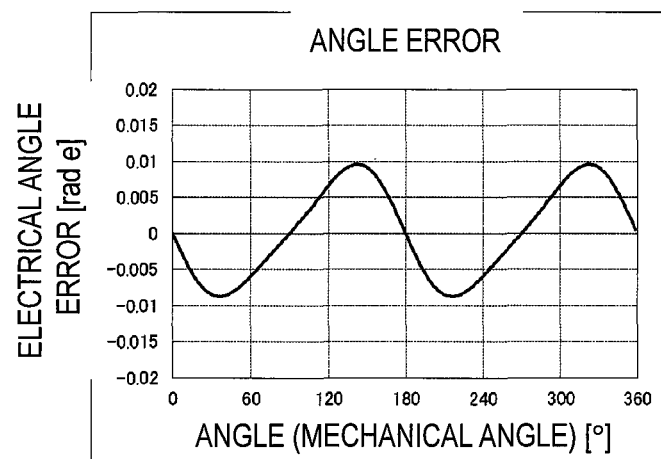
FIG. 11 is a graph showing a relationship between the mechanical angle and the detected angle error in a case where a mismatch between the rotation axis of the rotor and the central axis of the stator occurs, where the number of turns and the winding direction are set according to the embodiment with specific example 2 (the total number of teeth is 16, and the drive number is 2)

In this case, the detected angle error $m_x \theta_{err}$ at the time when the rotation axis 21 of the rotor 20 and the central axis 12 of the stator 10 are aligned with each other is as shown in FIG. 10, and the detected angle error $m_x \theta_{err}$ at the time when the central axis 12 of the stator 10 is displaced from the rotation axis 21 of the rotor 20 by +0.25 mm in the direction of $\xi = -\pi/2$ [rad], that is, the direction of the arrow of the x axis shown in FIG. 2 is as shown in FIG. 11. The width (peak-to-peak width) of the detected angle error $m_x \theta_{err}$ at the time when the rotation axis 21 of the rotor 20 and the central axis 12 of the stator 10 are aligned with each other is approximately 0.034 [rad e], and the width (peak-to-peak width) of the detected angle error $m_x \theta_{err}$ at the time when the central axis 12 of the stator 10 is displaced from the rotation axis 21 of the rotor 20 by +0.25 mm in the direction of the arrow of the x axis shown in FIG. 2 is 0.018 [rad e].

The essence of the present invention consists in determination of the number of turns and the winding direction of each of the cosine-phase coil and the sine-phase coil wound round each tooth, and the number of turns and the winding direction can be applied not only to the variable reluctance resolver but also any common one-phase excitation/two-phase output resolver, such as a brushless resolver. Furthermore, the shapes of the stator and the rotor comprised in the resolver to which the present invention can be applied are not particularly limited. The stator may not have the cylindrical shape described above and can be shaped like a plain washer. Even in that case, the technical descriptions concerning the structure of the stator except for the shape (such as the arrangement of the teeth or the configuration of the teeth) hold true. Furthermore, the rotor may not have the columnar shape described above and can be shaped like a thin plate. Even in that case, the technical descriptions concerning the structure of the rotor except for the shape (such as the shape of the outer periphery of the rotor or the positioning of the rotor inside the stator) hold true.

The foregoing description of the embodiments of the invention has been presented for the purpose of illustration and description. It is not intended to be exhaustive or to limit the invention to the precise form disclosed. Modifications or variations are possible in light of the above teachings. The embodiment was chosen and described to provide the illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A one-phase excitation/two-phase output resolver, wherein, letting N denote a total number of teeth and i denote an integer equal to or greater than 1 and equal to or smaller than N, the N representing an even number, the number of turns and the winding direction of a cosine-phase coil wound around an i-th tooth is set according to $$T_{c,i} = T_{S\,max} \cos(m_s \xi_i + \theta_2) + T_{2c} \cos(m_e \xi_i + \theta_1),$$

and the number of turns and the winding direction of a sine-phase coil wound around the i-th tooth is set according to $$T_{s,i} = T_{S\,max} \sin(m_s \xi_i + \theta_2) + T_{2s} \cos(m_e \xi_i + \theta_1),$$

where $T_{Smax}$ represents a first reference number of turns of each of detecting coils of each phase (cosine-phase coils, sine-phase coils), $T_{2c}$ represents a second reference number of turns of each of the cosine-phase coils, $T_{2s}$ represents a second reference number of turns of each of the sine-phase coils, $m_x$ represents a drive number, $m_e$ represents a pole pair number in a magnetic flux distribution formed by exciting coils, $m_s$ represents a pole pair number in each magnetic flux distribution formed by the detecting coils of each phase (the cosine-phase coils, the sine-phase coils), $\theta_1$ represents a phase of the exciting coils, $\theta_2$ represents a phase of the detecting coils of each phase (the cosine-phase coils, the sine-phase coils), $\xi_i$ represents a mechanical angle of the i-th tooth ($=2\pi(i-1)/N$), relations $m_s \pm m_e \pm m_x = 0$ and $|m_x| \neq |2m_e|$ hold, the number of turns of the cosine-phase coil is represented by the absolute value of $T_{c,i}$, the winding direction of the cosine-phase coil is represented by the sign of $T_{c,i}$, the number of turns of the sine-phase coil is represented by the absolute value of $T_{s,i}$, and the winding direction of the sine-phase coil is represented by the sign of $T_{s,i}$.

2. The resolver according to claim 1, wherein the second reference number of turns $T_{2c}$ of the cosine-phase coil and the second reference number of turns $T_{2s}$ of the sine-phase coil are determined according to $$T_{2c} = \frac{\alpha \cdot \eta_1 \cdot A_{max} \cdot T_{Smax}}{2\sqrt{1 + \tan^2(\eta_2 \mu_{max})}}$$

$$T_{2s} = T_{2c} \tan(\eta_2 \mu_{max})$$

based on a value of $A_{max}$ multiplied by $\eta_1$ and an antiphase of a value of $\mu_{max}$ multiplied by $\eta_2$, where α represents a gap change rate that satisfies a relation $0 < |\alpha| < 1$, $\eta_1$ and $\eta_2$ are predefined constant values that satisfy relations $0 < \eta_1 < 1$ and $0 < \eta_2 < 1$, and the $A_{max}$ and the $\mu_{max}$ are respectively a maximum amplitude and a maximum phase error of a detected angle error of the resolver expected in advance.

* * * * *

UNITED STATES PATENT AND TRADEMARK OFFICE
CERTIFICATE OF CORRECTION

PATENT NO. : 9,500,500 B2  
APPLICATION NO. : 14/698182  
DATED : November 22, 2016  
INVENTOR(S) : Hiroki Ookawara et al.

Page 1 of 5

It is certified that error appears in the above-identified patent and that said Letters Patent is hereby corrected as shown below:

In the Specification

At Column 2, Line 60 of the printed patent:

"$T_e = T_{E\,max} \cos(m_e \xi)$ (2)"

Should read:

-- $T_e = T_{Emax} \cos(m_e \xi)$ $\cdots$(2) --

At Column 3, Line 28 of the printed patent:

"$T_c = T_{S\,max} \cos(m_s \xi)$ (3)"

Should read:

-- $T_c = T_{S\,max} \cos(m_s \xi)$ $\cdots$(3) --

At Column 3, Line 57 of the printed patent:

"$T_s = T_{S\,max} \sin(m_s \xi)$ (4)"

Should read:

-- $T_s = T_{S\,max} \sin(m_s \xi)$ $\cdots$(4) --

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,500,500 B2

At Column 4, Line 41 of the printed patent:

"$T_{c,i} = T_{S\,max} \cos(m_s \xi_i + \theta_2) + T_{2c} \cos(m_e \xi_i + \theta_1)$"

Should read:

-- $T_{c,i} = T_{S\,max} \cos(m_s \xi_i + \theta_2) + T_{2c} \cos(m_e \xi_i + \theta_1)$ --

At Column 4, Line 46 of the printed patent:

"$T_{s,i} = T_{S\,max} \sin(m_s \xi_i + \theta_2) + T_{2s} \cos(m_e \xi_i + \theta_1)$"

Should read:

-- $T_{s,i} = T_{S\,max} \sin(m_s \xi_i + \theta_2) + T_{2s} \cos(m_e \xi_i + \theta_1)$ --

At Column 5, Line 11-14 of the printed patent:

$$T_{2c} = \frac{\alpha \cdot \eta_1 \cdot A_{max} \cdot T_{S\,max}}{2\sqrt{1 + \tan^2(\eta_2 \mu_{max})}}$$

$$T_{2s} = T_{2c} \tan(\eta_2 \mu_{max})$$

Should read:

$$T_{2c} = \frac{\alpha \cdot \eta_1 \cdot A_{max} \cdot T_{Smax}}{2\sqrt{1 + \tan^2(\eta_2 \mu_{max})}}$$

$$T_{2s} = T_{2c} \tan(\eta_2 \mu_{max})$$

At Column 8, Line 41-50 of the printed patent:

$$m_x \theta_{err} = m_x(\theta' - \theta) - \theta_0 \quad (9)$$

$$= \frac{\pm A_s \cos(m_x \theta') \mp A_{2c} \sin(m_x \theta')}{A_1}$$

$$\approx \frac{\pm A_{2s} \cos(m_x \theta + \theta_0) \mp A_{2c} \sin(m_x \theta + \theta_0)}{A_1}$$

$$= -\frac{\pm A_{2c} \sin(m_x \theta + \theta_0) \mp A_{2s} \cos(m_x \theta + \theta_0)}{A_1}$$

$$= -\frac{\sqrt{A_{2s}^2 + A_{2c}^2}}{A_1} \sin\left(m_x \theta + \theta_0 - \tan^{-1}\left(\frac{A_{2s}}{A_{2c}}\right)\right)$$

CERTIFICATE OF CORRECTION (continued)
U.S. Pat. No. 9,500,500 B2

Should read:

-- 
$$\begin{aligned}
m_x \theta_{a_1} &= m_x(\theta' - \theta) - \theta_0 \\
&= \frac{\pm A_{2s}\cos(m_x\theta') \mp A_{2c}\sin(m_x\theta')}{A_1} \\
&= \frac{\pm A_{2s}\cos(m_x\theta + \theta_0) + A_{2c}\sin(m_x\theta + \theta_0)}{A_1} \\
&= -\frac{\pm A_{2c}\sin(m_x\theta + \theta_0) + A_{2s}\cos(m_x\theta + \theta_0)}{A_1} \\
&= -\frac{\sqrt{A_{2s}^2 + A_{2c}^2}}{A_1}\sin(m_x\theta + \theta_0 - \tan^{-1}(\frac{A_{2s}}{A_{2c}})) \quad \cdots (9)
\end{aligned}$$
 --

At Column 10, Line 50 to Column 11, Line 11 of the printed patent:

"
$$\begin{aligned}
V_{sin,i} &= i_e \cdot P \cdot \{1 + \alpha\cos(m_x(\theta + \xi_i))\} \cdot \quad (12)\\
&\quad \{T_{Smax}\sin(m_s\xi_i + \theta_2) + T_{2s}\cos(m_e\xi_i + \theta_1)\} \cdot T_{Emax}\\
\cos(m_e\xi_i + \theta_1) &= i_e \cdot P \cdot T_{Emax} \cdot \{1 + \alpha\cos(m_x(\theta + \xi_i))\} \cdot \Big[\frac{T_{Smax}}{2} \\
&\quad \{\sin((m_s + m_e)\xi_i + \theta_1 + \theta_2) + \sin((m_s - m_e)\xi_i - \theta_1 + \theta_2)\} + \\
&\quad \frac{T_{2s}}{2}\{\cos(2m_e\xi_i + 2\theta_1) + 1\}\Big] = i_e \cdot P \cdot T_{Emax} \cdot \Big[\frac{T_{Smax}}{2} \\
&\quad \{\sin((m_s + m_e)\xi_i + \theta_1 + \theta_2) + \sin((m_s - m_e)\xi_i - \theta_1 + \theta_2)\} + \\
&\quad \frac{T_{2s}}{2}\{\cos(2m_e\xi_i + 2\theta_1) + 1\} + \\
&\quad \frac{\alpha T_{Smax}}{4}\sin((m_s + m_e + m_x)\xi_i + \theta_1 + \theta_2 + m_x\theta) + \\
&\quad \frac{\alpha T_{Smax}}{4}\sin((m_s + m_e - m_x)\xi_i + \theta_1 + \theta_2 - m_x\theta) + \\
&\quad \frac{\alpha T_{Smax}}{4}\sin((m_s - m_e + m_x)\xi_i - \theta_1 + \theta_2 + m_x\theta) + \\
&\quad \frac{\alpha T_{Smax}}{4}\sin((m_s - m_e - m_x)\xi_i - \theta_1 + \theta_2 - m_x\theta) + \\
&\quad \frac{\alpha T_{2s}}{4}\cos((2m_e + m_x)\xi_i + 2\theta_1 + m_x\theta) + \\
&\quad \frac{\alpha T_{2s}}{4}\cos((2m_e - m_x)\xi_i + 2\theta_1 - m_x\theta) + \\
&\quad \frac{\alpha T_{2s}}{4}\cos(m_x\xi_i + m_x\theta) + \frac{\alpha T_{2s}}{4}\cos(-m_x\xi_i - m_x\theta)\Big]
\end{aligned}$$
"

Should read:

$$\begin{aligned}
V_{sin,i} &= i_c \cdot P \cdot \{1 + \alpha \cos(m_x(\theta + \xi_i))\} \\
&\quad \cdot \{T_{S\,max} \sin(m_s \xi_i + \theta_2) + T_{2s} \cos(m_e \xi_i + \theta_1)\} \cdot T_{E\,max} \cos(m_e \xi_i + \theta_1) \\
&= i_c \cdot P \cdot T_{E\,max} \cdot \{1 + \alpha \cos(m_x(\theta + \xi_i))\} \\
&\quad \cdot \left[ \frac{T_{S\,max}}{2} \{\sin((m_s + m_e)\xi_i + \theta_1 + \theta_2) + \sin((m_s - m_e)\xi_i - \theta_1 + \theta_2)\} \right. \\
&\quad \left. + \frac{T_{2s}}{2} \{\cos(2m_e \xi_i + 2\theta_1) + 1\} \right] \\
&= i_c \cdot P \cdot T_{E\,max} \\
&\quad \cdot \left[ \frac{T_{S\,max}}{2} \{\sin((m_s + m_e)\xi_i + \theta_1 + \theta_2) + \sin((m_s - m_e)\xi_i - \theta_1 + \theta_2)\} \right. \\
&\quad + \frac{T_{2s}}{2} \{\cos(2m_e \xi_i + 2\theta_1) + 1\} \\
&\quad + \frac{\alpha T_{S\,max}}{4} \sin((m_s + m_e + m_x)\xi_i + \theta_1 + \theta_2 + m_x \theta) \\
&\quad + \frac{\alpha T_{S\,max}}{4} \sin((m_s + m_e - m_x)\xi_i + \theta_1 + \theta_2 - m_x \theta) \\
&\quad + \frac{\alpha T_{S\,max}}{4} \sin((m_s - m_e + m_x)\xi_i - \theta_1 + \theta_2 + m_x \theta) \\
&\quad + \frac{\alpha T_{S\,max}}{4} \sin((m_s - m_e - m_x)\xi_i - \theta_1 + \theta_2 - m_x \theta) \\
&\quad + \frac{\alpha T_{2s}}{4} \cos((2m_e + m_x)\xi_i + 2\theta_1 + m_x \theta) \\
&\quad + \frac{\alpha T_{2s}}{4} \cos((2m_e - m_x)\xi_i + 2\theta_1 - m_x \theta) \\
&\quad + \frac{\alpha T_{2s}}{4} \cos(m_x \xi_i + m_x \theta) \\
&\quad \left. + \frac{\alpha T_{2s}}{4} \cos(-m_x \xi_i - m_x \theta) \right] \quad \cdots (12)
\end{aligned}$$

In the Claims

At Column 15, Line 43 of the printed patent:

"$T_{c,i} = T_{S\,max} \cos(m_s \xi_i + \theta_2) + T_{2c} \cos(m_e \xi_i + \theta_1)$"

Should read:

-- $T_{c,i} = T_{S\,max} \cos(m_s \xi_i + \theta_2) + T_{2c} \cos(m_e \xi_i + \theta_1)$ --

At Column 15, Line 49 of the printed patent:

"$T_{s,i} = T_{S\,max} \sin(m_s \xi_i + \theta_2) + T_{2s} \cos(me_{\xi i} + \theta_1)$"

Should read:

-- $T_{s,i} = T_{S\,max} \sin(m_s \xi_i + \theta_2) + T_{2s} \cos(m_e \xi_i + \theta_1)$ --

CERTIFICATE OF CORRECTION (continued)
U.S. Pat. No. 9,500,500 B2

At Column 16, Line 42 of the printed patent:

"where a represents a gap"

Should read:

-- where $\alpha$ represents a gap --